No. 854,696. PATENTED MAY 21, 1907.
W. JONES.
APPARATUS FOR ANALYZING GASES.
APPLICATION FILED NOV. 21, 1906.
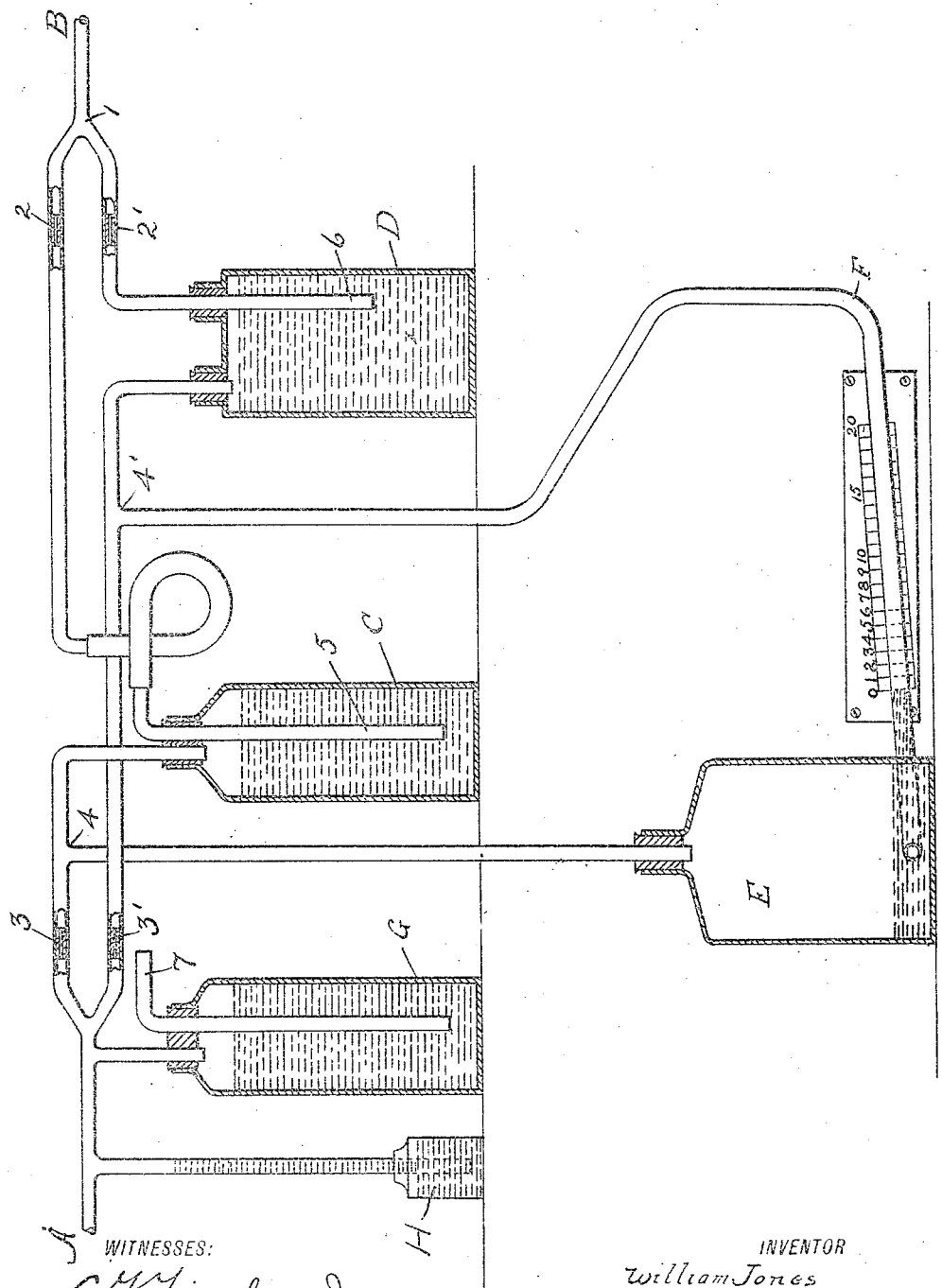
WITNESSES:
INVENTOR
William Jones
BY
ATTORNEYS

UNITED STATES PATENT OFFICE.

WILLIAM JONES, OF NEW YORK, N. Y., ASSIGNOR TO THE JONES-JULIA MFG. CO., OF NEW YORK, N. Y., A CORPORATION OF NEW YORK.

APPARATUS FOR ANALYZING GASES.

No. 854,696.      Specification of Letters Patent.      Patented May 21, 1907.

Application filed November 21, 1906. Serial No. 344,404.

*To all whom it may concern:*

Be it known that I, WILLIAM JONES, a subject of the King of Great Britain, and a resident of New York, in the county of New York and State of New York, with post-office address 605 West One Hundred and Thirty-seventh street, have invented certain new and useful Improvements in Apparatus for Analyzing Gases, of which the following is a specification.

This invention relates to an apparatus for analyzing a continuous stream of gas for the purpose of ascertaining the percentage of a constituent thereof.

It has been proposed heretofore to ascertain the percentage of constituent by feeding the gas continuously in limited amount through an absorbent, and determining the value of the constituent by the change of tension produced by the removal of such constituent by the absorbent as indicated upon a suitable manometer.

This method is open to the objection that a change in the pressure or tension at which the gas is fed to the instrument will cause a fluctuation in the tension of the gas in the space with which the manometer is connected and will therefore affect the reading of the instrument, and hence with this method the results will be only accurate for a given pressure for which the apparatus has been adjusted and which has been kept stationary. The accuracy of the reading will likewise be affected by changes at the vacuum or suction end of the system for a similar reason.

The object of the present invention is to overcome this objection, to which end the invention consists substantially in feeding the gas in two streams, absorbing an absorbable constituent thereof from one of said streams passing in limited amount through the absorbent and then through a chamber in which the tension may be observed and utilizing the difference between the changed tension or pressure thus produced and the tension or pressure of the other stream as an indication of the percentage of such constituent.

In carrying out the invention the limited flow of gas in the chamber or chambers whose difference of pressure is measured, is preferably secured by connecting them with the pressure and exhaust pipes through minute inlets and outlets as has heretofore been proposed in the art.

A manometer is suitably connected to the two streams so as to give readings which measure the difference of tension or pressure between them due to the removal of a constituent of the gas in one of said streams by the action of the absorbent.

To balance the resistance to the passage of the gas through the absorbent for one of the streams, it is preferable to employ a non-absorbing solution in the path of the other stream. To secure a reading due to the difference of tension in the streams of gas, the two sides of the manometer may be connected respectively to the chambers or spaces through which the streams of gas flow in limited amount, as hereinafter more particularly described. Under this condition the manometer will respond properly to differences of tension between the two streams, but it will be affected alike on its two sides by any changes in the difference of tension between the inlet or supply and the exhaust or suction ends of the stream respectively and the readings will not be disturbed as already set forth.

My invention is designed to be used in connection with furnaces to show the percentage of $CO_2$ in the gases passing through the flue, thus making it possible to regulate the amount of air to insure proper combustion of the fuel. It is, however, obviously useful for the testing of any mixture of gases by the use of a proper absorbent.

In the accompanying drawings, I show in side elevation an apparatus by which my invention may be practiced.

B is the supply end of the system through which gas is fed after passing any necessary filter or condenser.

A is the suction or exhaust end of the system, the flow of gas being due to the difference in tension or pressure between B and A as well understood in the art.

The main purpose of my invention is to prevent any changes in such difference of tension or pressure from disturbing the readings of the instrument.

At 1 the gas divides into two streams, one of which passes through a minute inlet 2 comprising, preferably, a tube of very small bore and escapes through a similar minute outlet 3 to the suction end A of the system. The other stream passes in a similar manner through a minute inlet and outlet 2′ and 3′. By these means, a limited amount of gas only can pass and a certain amount of vacuum will be produced in the chambers or passages located between 2 and 3 and between 2′ and 3′. Between 2′ and 3′ is located the absorption chamber comprising, for instance, a tank D containing a solution of caustic potash or other absorbent.

At 4′ or at any other suitable point where the tension of the gas feeding from B is changed from the normal, owing to the absorption of the constituent $CO_2$ or other gas, a pipe is led to one side of a suitable manometer as at F. At 4 in the pipe or passage between 2 and 3 connection is made to the other side E of such manometer.

Preferably, I interpose in the connection from 2 to 3 another tank C containing a non-absorbing solution through which the gas is caused to pass so that by regulating the depth of immersion of the tubes 5 and 6, the resistance to the passage of the gas in the two chambers or passages may be adjusted to produce a tension which would be the same if the gas were of such nature as not to be absorbed or modified in respect to its constituents by passage through either one of the tanks D or C. Owing to the system of connections it is obvious that the changes of tension at 4 and 4′ will be the same if caused by any change or difference of tension between B and A. If now gas containing carbon dioxid be passed through the apparatus, it will be absorbed in the potash solution in D and the equilibrium in the manometer will be disturbed and the liquid in the measuring tube of the manometer connected to F will rise in direct proportion to the amount of gas removed by the solution in D. This reading enables the operator to ascertain the percentage of said constituent $CO_2$ in the well known way.

The form of manometer shown has a sloping or inclined graduated tube on the side F of very small internal diameter which in practice may be 3 millimeters. At the other end E a large tube or bottle is employed so that practically all the movement due to changes of pressure will be in the small tube. The capillary attraction in the small tube causes its surface to stand at right angles to the bore of the tube instead of occupying a horizontal plane. The apparatus may be arranged to indicate one per cent for each one-fiftieth of an inch of vertical rise, by inclining the small tube at such an angle that this movement is multiplied by ten. Thus if the tube rises 1 in 10, the liquid in rising one-fiftieth will move one-fifth of an inch in the bore of the tube for each per cent.

To bring the apparatus to scale or to register correctly, I preferably employ means for regulating the suction applied at A. A device suitable for this purpose comprises a liquid-containing tank G connected to the suction pipe A and having a regulable gas inlet tube 7 whose immersion may be varied to vary the rate of inflow of air or gas into the pipe A at or near where it is attached to the outlet 3, 3′. By depressing the tube 7, the suction or vacuum in A can be made stronger while by raising it the vacuum will be decreased owing to the admission of air or gas through G. A manometer H filled with glycerin may be used to indicate the degree of suction or vacuum.

As will be seen, my invention differs essentially from prior methods in that I employ a second stream of gas in addition to that which is passed through the absorbent and by such two streams balanced against one another in the manometer compensate for changes in the tension at the supply B or suction A so that the manometer will respond alone to changes in the tension of gas produced by the action of the absorbent and will at all times read correctly.

What I claim as my invention is:

1. In an apparatus for analyzing gases, the combination of means for causing the gas to flow in two streams through two chambers or passages, means for absorbing a constituent of the gas in passing through one of said chambers, and means for giving a continuous indication of the difference of tension of the gases in the two streams by causing their pressures to oppose one another thus permitting the percentage of the constituent removed to be observed without disturbance from fluctuations in the pressure at which the gas is supplied or removed.

2. In an apparatus for analyzing gases, the combination of two chambers through each of which a stream of the gas to be analyzed is passed in limited amount as described, one of said chambers being provided with an absorbing and the other with a non-absorbing solution, and a manometer the opposite sides of which are connected to said chambers respectively so as to be subject respectively to the tension of the gas in said chambers, whereby its readings will be due to the difference between the tension resulting from the removal of the constituent whose percentage is to be measured from one stream, and the tension of the gas in the other stream.

Signed at New York in the county of New York and State of New York this 19th day of November A. D. 1906.

WILLIAM JONES.

Witnesses:
C. F. TISCHNER, Jr.,
LILLIAN BLOND.